United States Patent [19]

Meier et al.

[11] 4,449,155

[45] May 15, 1984

[54] GIMBAL ASSEMBLY FOR FLYING MAGNETIC TRANSDUCER HEADS

[75] Inventors: Markus Meier, Carpinteria; David A. Sutton, Santa Ynez, both of Calif.

[73] Assignee: DMA Systems Corporation, Goleta, Calif.

[21] Appl. No.: 321,336

[22] Filed: Nov. 16, 1981

[51] Int. Cl.³ .......................... G11B 21/20; G11B 5/60
[52] U.S. Cl. ..................................... 360/104; 360/103
[58] Field of Search ................................ 360/104, 103

[56] References Cited

U.S. PATENT DOCUMENTS

| | | | |
|---|---|---|---|
| 3,896,495 | 7/1975 | Beecroft | 360/103 |
| 4,058,843 | 11/1977 | Gyi | 360/103 |
| 4,163,267 | 7/1979 | DeMoss | 360/102 |
| 4,306,258 | 12/1981 | Higashiyama et al. | 360/104 |
| 4,309,732 | 1/1982 | Kronfeld et al. | 360/104 |

*Primary Examiner*—Robert S. Tupper
*Attorney, Agent, or Firm*—Spensley, Horn, Jubas & Lubitz

[57] ABSTRACT

In an apparatus of the type including a magnetic transducer head adapted for flying on a fluid bearing in close proximity to a transducing surface and a gimbal apparatus to which the head is mounted for flying so as to provide flexural freedom of rotation of the head around roll and pitch axes parallel to the transducing surface and flexural freedom of translation in the direction of an axis perpendicular to the surface while restraining rotation of the head about the axis perpendicular to the surface and translation of the head in directions parallel to the surface, the gimbal apparatus comprising a thin, resilient, gimbal sheet having an external shape and interior openings defining an outer ring attachable to a gimbal sheet support at substantially opposite points on the outer ring and an inner ring spaced apart from the outer ring and attached to it by a pair of webs intersecting the outer ring at opposite interior edges between the points at which the outer ring is attached to the gimbal sheet support, the inner ring being attached to the transducer head at a point between the two webs, there is disclosed an improvement wherein both of the outer and inner rings have material removed therefrom to form a modified truss-type structure to increase the flexural freedom of translation in the direction of the axis perpendicular to the surface without upsetting the rigidity of the gimbal sheet in the plane thereof.

3 Claims, 3 Drawing Figures

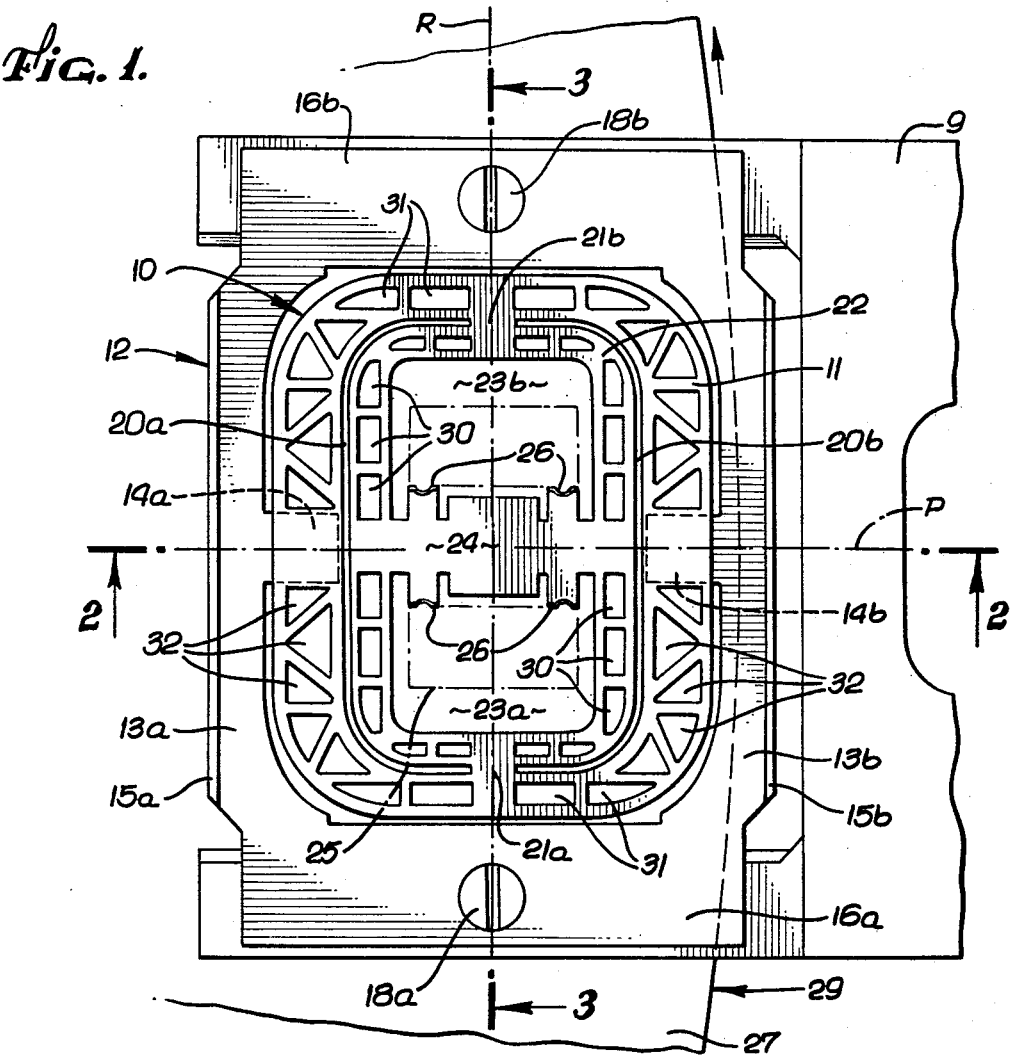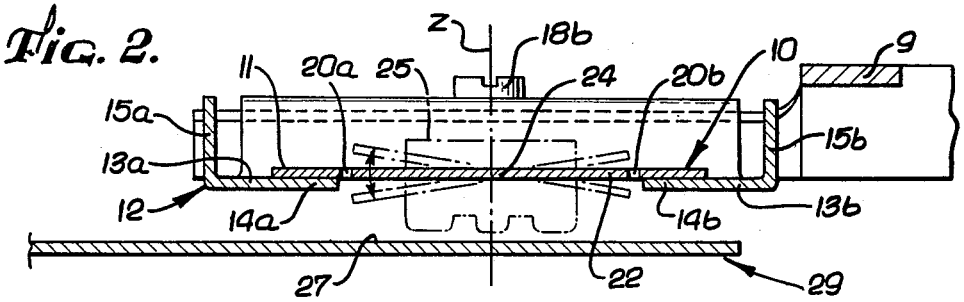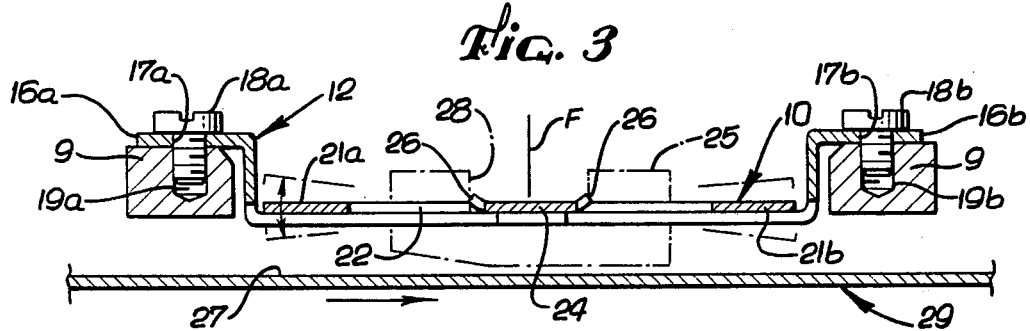

GIMBAL ASSEMBLY FOR FLYING MAGNETIC TRANSDUCER HEADS

BACKGROUND OF THE INVENTION

1. Field of the Invention

The present invention relates to a gimbal assembly for flying magnetic transducer heads and, more particularly, to such a gimbal assembly which allows for a significant improvement in the ratio of in-plane stiffness to stiffness in a direction normal to the gimbal plane.

2. Description of the Prior Art

Magnetic disc storage systems are widely used to provide large volumes of relatively low cost computer-accessible memory or storage. A typical disc storage device has a number of discs coated with a suitable magnetic material mounted for rotation on a common spindle and a set of transducer heads carried in pairs on elongated supports for insertion between adjacent discs, the heads of each pair facing in opposite directions to engage opposite faces of adjacent discs. The support structure is coupled to a positioner motor, the positioner motor typically including a coil mounted within a magnetic field for linear movement and oriented relative to the discs to move the heads radially over the disc surfaces to thereby enable the heads to be positioned over any annular track on the surfaces. In normal operation, the positioner motor, in response to control signals from the computer, positions the transducer heads radially for recording data signals on or retrieving data signals from a preselected one of a set of concentric recording tracks on the discs.

As the density at which digital information is recorded on a magnetic recording surface is increased, the gap between the recording head and the magnetic recording surface must be decreased. The smaller the gap and the closer the magnetic head is positioned with respect to the recording surface, the more difficult it becomes to control the mechanical tolerances of the structure mounting the recording head. To overcome these mechanical difficulties, mechanical recording heads are placed in head assemblies adapted for floating on a thin film of air created by the laminar air flow due to the rotation of the recording surface. Modern magnetic disc drives incorporate rigid substrate discs, the surfaces of which are polished to a high finish so that the head can reliably fly on the air bearing. Systems are presently being developed wherein the heads fly above the disc recording surfaces at heights of less than 20 microinches.

In such systems, when the recording medium rotates, the laminar air flow causes the head assembly to be forced away from the medium. Therefore, some urging means, such as a spring, must be provided to overcome this air flow and counterbalance the head assembly, keeping it as close to the recording medium as possible. Furthermore, floating magnetic recording head assemblies are often mounted in gimbal mounting devices in order to allow the angle and position of the magnetic recording head assembly to conform to the air bearing.

Even with spring loaded gimbal assemblies, disc and drum dimensions and spindle bearing run-out can not be controlled accurately enough to prevent small but significant variations in the clearance between the disc and the head during operation. Variations may be very slight, but when dealing, as here, with head-to-recording surface clearances of less than 20 microinches, even minor deviations can be disastrous because the air film supporting the head assembly adjacent the surface can then be penetrated by the head. When this occurs, the recording surface and head assembly abrade each other and the particles so formed cause even more abrasion to occur in an avalanche effect which soon destroys both recording surface and head assembly. Accordingly, it is necessary to permit the head to move perpendicularly to and rotate about pitch and roll axes parallel to the recording surface to maintain the desired clearance between the two. It should be understood that this movement, while only a matter of microinches, is extremely rapid because of the high disc speeds involved. It is necessary that while the head is shifting to accommodate these changes, it should not be moved from registration with the track beneath it.

In order for the head to follow rapid movement of the recording surface, it is necessary, first of all, that the head and the supporting structure should be as light as possible to decrease mass which must be accelerated by the forces of the air film. Secondly, the head must be suspended very rigidly with respect to its support, so as to prevent translation of the head relative to the arm and parallel to the recording surface, as this will interfere with transcribing. Rotation of the head about an axis normal to the recording surface must also be prevented so as to keep the gaps parallel to the individual bit patterns at all times.

To summarize, the head suspension can be considered as a six-degree-of-freedom system. These six degrees are rotation and translation about two orthogonal axes (roll and pitch) parallel to the recording surface and the axis normal thereto. The ideal mount should have a very low spring rate for rotation of the head about any axis parallel to the recording surface. The spring rate for translation along an axis normal to the recording surface must be controlled quite closely to maintain the proper head-to-surface clearance. The assembly should have very little sprung weight. On the other hand, the head should be mounted so as to have very high spring rates for translation of the head parallel to the recording surface and in rotation about an axis normal to it.

The most effective apparatus used heretofor for achieving the desired result employs a gimbal sheet formed from a single, thin, approximately square, piece of resilient material, such as steel, for attaching a transducing head to a head arm. Typical gimbal sheets are disclosed in U.S. Pat. No. 3,896,495 (Beecroft) and U.S. Pat. No. 4,058,843 (Gyi). In the Beecroft patent, the gimbal sheet is flat. The head arm itself is as rigid as possible to prevent any appreciable deflection of it during operation. The periphery of the gimbal sheet is attached at mounting points on its opposite edges to a side of the cantilevered head arm end so as to be positioned generally parallel to an adjacent recording surface in such a manner that a clearance space between the arm and every part (except for the mounting points) of the gimbal sheet exists. This is accomplished by mounting this sheet across an opening in the arm end. Two cut-out portions of the sheet define inner edges of an outer or peripheral ring of the sheet, which ring is the element carrying the points attached to the arm. The distance between the outer edge and the adjacent inner edge is preferably several times greater than the thickness of the sheet itself. The entire inner edge of the outer ring is not cut free, but two webs on opposite sides of the sheet remain attached to and integral with the external ring, one on each side of the sheet, between the edges attached to the head arm. These webs are free to, in effect, rotate about a pitch axis parallel to the recording surface and passing approximately through the mounting points, by bending of the outer ring.

The webs are also integral with an inner area whose outer edge is defined by the cut-out portions previously mentioned. An opening is also present within the inner area which transforms into a ring slightly smaller than the outer ring, but having a similar difference between the inner and outer dimensions. The head itself is attached across this opening at two points on the inner ring forming a clearance between itself and all other objects. When so positioned, the head is suspended from the arm by the gimbal sheet and direct contact between the head and arm is, at the most, only through a load spring. The attachment points of the head to the gimbal sheet are to the innner ring and are preferably on a line approximately parallel to the pitch axis.

From an inspection of the Beecroft patent, it can be seen that the head can rotate about a roll axis parallel to the recording surface and normal to the pitch axis with very little resistance from the gimbal sheet by bending the relatively long cantilevered sides of which the outer and inner rings are comprised. Their relative thinness in the direction normal to the recording surface allows elastic deflection of them quite easily. For this reason, the head can also be easily translated along an axis normal to the recording surface. However, resistance to rotation around this axis is very high since, in this case, either compression or tension loads are placed on the ring sides or bending moments about axes normal to the recording surface are placed on them. For the same reasons, the gimbal sheet strongly resists translation along the roll and pitch axes.

If the gimbal sheet is made laterally symmetrical with respect to both the pitch and roll axes, translation along the axis normal to the recording surface will be perfectly straight line and cause no rotation of the head about this axis. Thus, the head can be expected to precisely follow the recording track beneath it regardless of variations in its height. Furthermore, only a very small amount of mass in addition to the head is moved whenever the head position is changed. Thus, forces necessary to accelerate the head at a given rate are much smaller than those previously required. This allows the transducing head to be flown closer to the recording surface, a desirable condition, with fear that the head will strike the recording surface due to small changes in its height. The force generated by the air bearing as the height changes is sufficient to accelerate the head away from the recording surface quickly enough to avoid their touching.

Secondly, since the roll and pitch axes are quite close to the air bearing surface of the head, as roll and pitch occurs, translation of the head along axes parallel to the recording surface is minimized. This is particularly important when the head rolls, because this causes translation of the head normal to the data track and parallel to the recording surface. This lack of registration between the head and track must, when the entire arm moves, be compensated for by repositioning of the carriage carrying the arm and the net result is less precision in head position.

When making a gimbal sheet, as in Beecroft, Gyi, and other similar systems, it is desirable to make the gimbal sheet as thin as possible to provide for as low a spring rate as possible for translation along an axis normal to the recording surface. As a practical matter, a limit is reached as to the degree of thinness possible because of fabrication and handling problems. Thus, there has been an upper limit to the ratio of stiffness of the gimbal sheet in the plane thereof to stiffness normal to the plane thereof. Significant improvements in this ratio have been unobtainable heretofor.

SUMMARY OF THE INVENTION

According to the present invention, significant improvements in the ratio of stiffness of the gimbal sheet in the plane thereof to stiffness normal to the plane thereof is achieved. Furthermore, this is achieved without making the gimbal sheet thinner than is practical for fabrication and handling and also without making the gimbal sheet wider than is practical for use in small magnetic recording systems. This improvement in the ratio of in-plane stiffness to stiffness normal to the plane of the gimbal sheet allows a very low gram load head to be used, while still achieving good tolerance to disc placement uncertainty. Making the head more flexible in a direction perpendicular to the plane of the gimbal sheet also permits the head to be retracted without the necessity of retracting the arm which supports same by simply deflecting the gimbal sheet away from the disc surface.

Briefly, in an apparatus of the type including a magnetic transducer head adapted for flying on a fluid bearing in close proximity to a transducing surface and a gimbal apparatus to which the head is mounted for flying so as to provide flexural freedom of rotation of the head around roll and pitch axes parallel to the transducing surface and flexural freedom of translation in the direction of an axis perpendicular to the surface while restraining rotation of the head about the axis perpendicular to the surface and translation of the head in directions parallel to the surface, the gimbal apparatus comprising a thin, resilient, gimbal sheet having an external shape and interior openings defining an outer ring attachable to a gimbal sheet support at substantially opposite points on the outer ring and an inner ring spaced apart from the outer ring and attached to it by a pair of webs intersecting the outer ring at opposite interior edges between the points at which the outer ring is attached to the gimbal sheet support, the inner ring being attached to the transducer head at a point between the two webs, there is disclosed an improvement wherein both of the outer and inner rings have material removed therefrom to form a modified truss-type structure to increase the flexural freedom of translation in the direction of the axis perpendicular to the surface without upsetting the rigidity of the gimbal sheet in the plane thereof.

OBJECTS, FEATURES AND ADVANTAGES

It is therefore the object of the present invention to solve the problems associated with improving the ratio of in-plane stiffness to stiffness normal to the plane of gimbal sheet utilized for supporting a magnetic transducer head adapted for flying on a fluid bearing in close proximity to a transducing surface. It is a feature of the present invention to solve these problems by removing material from the rings of the gimbal sheet to form a modified truss-type structure to increase the flexural freedom of translation in the direction of an axis perpendicular to the gimbal sheet without upsetting the rigidity of the gimbal sheet in the plane thereof. An advantage to be derived is a significant improvement in the ration of in-plane stiffness to stiffness normal to the plane of a gimbal sheet. A further advantage is the ability to mount a very low gram load head. A still further advantage is the ability to retract a head without retracting the arm supporting same. Another advantage is the ability to achieve a high resonant frequency for translation of the head assembly in the plane of the gimbal sheet.

Still other objects, features, and attendant advantage of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a plan view of a gimbal assembly for flying magnetic transducer heads constructed in accordance with the teachings of the present invention shown attached to the end of a cantilevered arm and supported above a rotating transducing surface; and FIGS. 2 and 3 are sectional views taken along the lines 2—2 and 3—3, respectively, in FIG. 1.

DESCRIPTION OF THE PREFERRED EMBODIMENT

Referring now to the drawings, there is shown a preferred embodiment of gimbal sheet, generally designated 10. Gimbal sheet 10 is, in general outline, similar to the gimbal sheet of the Beecroft patent. That is, gimbal sheet 10 includes an outer ring 11, the opposite sides of which are adapted to be mounted to the ends of a cantilevered support or arm 9. The Beecroft patent teaches the formation of a plurality of mounting tabs made integral with the opposite sides of ring 11 for direct connection to the ends of arms 9. According to the preferred embodiment of the present invention, gimbal sheet 10 is connected to arm 9 through an intermediary support frame, generally designated 12.

Frame 12 is formed from a single, thin approximately square, piece of resilient material, such as steel, having a central rectangular cut-out area in which gimbal sheet 10 is mounted. Frame 12 has, integral with itself and projecting inwardly therefrom on opposite sides 13a and 13b, a pair of mounting tabs 14a and 14b, respectively, on which opposite sides of mounting ring 11 rest, tabs 14a and 14b preferably being spot welded to the sides of ring 11. Frame 12 has, integral with itself and projecting upwardly therefrom on opposite sides 13a and 13b, a pair of webs 15a and 15b, respectively, which provide additional strength to frame 12.

The remaining opposite sides 16a and 16b of frame 12 have offset portions, as shown most clearly in FIG. 3, for convenience in connection to arm 9. Sides 16a and 16b have mounting holes 17a and 17b, respectively, therein by which frame 12 may be connected to the end of arm 9. That is, screws 18a and 18b are extendable through holes 17a and 17b, respectively, in sides 16a and 16b, respectively, of frame 12 and into corresponding holes 19a and 19b, respectively, in arm 9.

The inner edge of outer ring 11 is defined by a pair of "C" shaped cut-out areas 20a and 20b oriented so that the arms of each are directed towards the arms of the other. A pair of webs 21a and 21b are defined between the ends of the arms of cut-out areas 20a and 20b and are integral with outer ring 11. An inner ring 22 has the outer edge thereof defined by the inner edges of cut-out areas 20a and 20b. The inner edge of inner ring 22 is defined by a pair of cut-out areas 23a and 23b. Between and defined by cut-out areas 23a and 23b is a bridge 24, including a plurality of fingers 26, to which a transducer head assembly 25, shown in outline, may be attached. Attachment of head assembly 25 to bridge 24 may be done with suitable epoxy-type glue or mechanical swaging of fingers 26 into a slot 28 in head assembly 25.

Preferably, gimbal sheet 10 is symmetrical about both a pitch axis P and a roll axis R. Roll axis R is in the plane of gimbal sheet 10 and parallel to the direction of rotation of a transducing surface 27 of a recording medium 29. Pitch axis P is perpendicular to roll axis R and parallel to the direction of movement of arm 9 as arm 9 moves head 25 radially across recording surface 27. An axis, designated Z, is perpendicular to the plane of gimbal sheet 10.

The operation of a gimbal sheet, such as gimbal sheet 10, is well known to those skilled in the art. A force F applied to gimbal sheet 10 in the direction of the Z axis will cause deflection thereof along this axis. If gimbal sheet 10 is made relatively thin, the spring rate in the Z direction is very low for small displacements. Gimbal sheet 10 is also free to rotate around pitch axis P and roll axis R. On the other hand, gimbal sheet 10 is ideally constrained from translational movement in the plane of gimbal sheet 10 and from rotational movement around the Z axis.

Experience has revealed that certain dimensions and materials are preferred for gimbal sheet 10 when used in a modern data storage system. Both frame 12 and gimbal sheet 10 are preferably made from non-magnetic stainless steel. Since frame 12 is not meant to flex, its thickness is preferably approximately eight mils. On the other hand, the preferable thickness of gimbal sheet 10 is 1.5 mils. Thinner stock will result in too fragile a structure and thicker stock results in greater stiffness in the Z direction then desired.

According to the present invention, a significant improvement in the ratio of in-plane stiffness to stiffness in the Z direction may be achieved by removing material from rings 11 and 22 in a way which does not upset the in-plane rigidity of gimbal sheet 10. As shown most clearly in FIG. 1, this may be achieved by providing inner ring 22 with a series of generally rectangular cut-outs 30. Outer ring 11, which is larger than inner ring 22, has a series of generally rectangular cut-outs 31 in the short side thereof and a series of triangular cut-outs 32 in the longer side thereof.

The overall effect is to provide a modified truss-type structure which, as is well known in the art, will significantly decrease the stiffness of gimbal sheet 10 in a direction perpendicular thereto without significantly decreasing its rigidity in the plane thereof. The result is a significant improvement in the ratio of in-plane stiffness to stiffness in the Z direction.

Because of the narrow dimensions of the sides of inner ring 22, there is insufficient room to place diagonal arms so that the cut-out areas 30 are rectangular in shape. However, the struts formed between cut-out areas 30 are sufficiently wide compared to the spaces therebetween that there is adequate rigidity. The same applies to the struts formed between cut-out areas 31 in the opposite sides of outer ring 11. On the other hand, because of the width of the remaining sides of outer ring 11, diagonal struts are formed between cut-out areas 32 to provide increased in-plane rigidity.

By significantly improving the ratio of in-plane stiffness to stiffness in the z direction, gimbal sheet 10 becomes suitable for supporting a very low gram load head. Gimbal sheet 10 will maintain adequate in-plane stiffness for increased mechanical resonance performance, but will permit good tolerance to Z axis disc placement uncertainty. Furthermore, the increased flexibility in the vertical direction will permit head 25 to be retracted from recording medium 29 without further retracting the entire arm 9 assembly, as described more fully in copending application Ser. No. 321,884, filed concurrently herewith and entitled "Head Loading and Retraction Apparatus for Magnetic Disc Storage Systems", now U.S. Pat. No. 4,376,294, and assigned to DMA Systems Corporation, the assignee of the present application.

While the invention has been described with respect to the preferred embodiment constructed in accordance therewith, it will be apparent to those skilled in the art that various modifications and improvements may be made without departing from the scope and spirit of the invention. For example, while a specific pattern of generally rectangular and triangular openings 30–32 has been shown in rings 11 and 22, it will be apparent to those skilled in the art that the pattern shown is only one of an almost infinite variety of possible patterns. Accordingly, it is to be understood that the invention is not to be limited by the specific illustrative embodiment, but only by the scope of the appended claims.

We claim:

1. In an apparatus of the type including a transducer head adapted for flying on a fluid bearing in close proximity to a transducing surface and gimbal means to which said head is mounted for flying so as to provide flexural freedom of rotation of said head around predetermined axes parallel to said surface and flexural freedom of translation in the direction of an axis perpendicular to said surface while restraining rotation of said head about said axis perpendicular to said surface and translation of said means in directions parallel to said surface, said gimbal means comprising a thin, resilient, gimbal sheet having an external shape and interior openings defining a first ring attachable to gimbal sheet support means at substantially opposite points on said first ring and a second ring spaced apart from said first ring and attached to it by a pair of webs intersecting said first ring at opposite interior edges between the points at which said first ring is attached to said gimbal sheet support means, said second ring being attached to said transducer head at point between said two webs, the improvement wherein:

both of said first and second rings have material removed therefrom to form openings therein which form a truss-type structure to reduce the stiffness of said gimbal sheet in the direction of said axis perpendicular to said surface without significantly reducing the rigidity of said gimbal sheet in the plane thereof.

2. In an apparatus according to claim 1, the improvement wherein each leg of said second ring has a plurality of generally rectangular openings therein.

3. In an apparatus according to claim 1 or 2, the improvement wherein said first ring has a plurality of generally rectangular openings therein and a plurality of triangular openings therein.

* * * * *